United States Patent [19]

Emmerich

[11] 4,154,532
[45] May 15, 1979

[54] HIGH PRECISION OPTICAL ALIGNMENT SYSTEM

[75] Inventor: Claude L. Emmerich, Scarsdale, N.Y.

[73] Assignee: The United States of America as represented by the Secretary of the Navy, Washington, D.C.

[21] Appl. No.: 897,995

[22] Filed: Apr. 20, 1978

[51] Int. Cl.² .............................................. G01B 11/26
[52] U.S. Cl. .................................... 356/152; 356/153; 356/249; 358/107
[58] Field of Search ...................... 356/152, 153, 249; 33/286, 292; 250/203 CT; 358/107

[56] References Cited

U.S. PATENT DOCUMENTS

| 2,995,992 | 8/1961 | Merritt | 356/249 |
| 3,234,864 | 2/1966 | Vizenor | 356/141 |
| 3,541,338 | 11/1970 | Duda et al. | 356/152 |

FOREIGN PATENT DOCUMENTS 1953352  5/1971  Fed. Rep. of Germany ........... 356/152

Primary Examiner—S. C. Buczinski
Attorney, Agent, or Firm—Richard S. Sciascia; Paul N. Critchlow

[57] ABSTRACT

An optical system such as an astronomical telescope must be carefully aligned to assure that its optical axis is normal to its mounting or support surface. Alignment is achieved by forming circumferentially-spaced diffuse reflectors on the face of the vidicon and by illuminating only these individual reflectors plus a small surface area in their immediate vicinity. Light from the reflectors passes through the optics to a liquid pool for reflection back to the vidicon face plate. If the alignment is true, the reflected images form at fixed locations. In this regard, the locations of the vidicon reflectors are so arranged that the images fall on unilluminated surface areas. Scanning then detects both the reflectors (dark on bright) and the images (bright on dark). Deviations from the fixed image locations represent misalignments which can be corrected.

7 Claims, 5 Drawing Figures

HIGH PRECISION OPTICAL ALIGNMENT SYSTEM

BACKGROUND OF THE INVENTION

The invention relates to optical systems and, in particular, to procedures for aligning the optical axes of the systems relative to their mounting surfaces.

Optical systems, such as automatic astronomical telescopes or the like, usually are mounted on support surfaces or plates and, for accurate results, the optical axes should lie at a precise angle relative to the mounting surface. This angle is known as the alignment angle and, prior to use of the optics, it must be carefully checked to determine with a high degree of accuracy any deviations that may exist. Deviations then can be corrected by re-adjusting the mounting. Alternatively, minor deviations can be accommodated in the computer which normally is used with these automatic telescopes.

Conventionally, alignment measurements are accomplished by generating an optical reference beam of known orientation and measuring the deviation of the image formed by the beam in the optical system from its center when the mounting surface is carefully leveled. The errors associated with this procedure generally are acceptable because it is possible to level a surface quite accurately by, for example, rotating it about a vertical axis or by the use of pendulous prisms to provide a reference orientation. There are, however, certain problems associated with such procedures. For example, the auxiliary test equipment used in the measurements can introduce errors. Further, the prior procedures rely somewhat upon the techniques and skills of the individual observers. Experience also has shown that even the movements of these observers around the test equipment can introduce errors in the measurements. In general, the achievement of the highest possible precision requires the elimination of the test equipment as well as the use of a procedure which eliminates the need for operating personnel in the immediate area.

It is therefore an object of the present invention to provide a fully automated procedure for measuring the so-called alignment angles as well as a procedure which eliminates as much as possible the need for auxiliary test equipment.

The purposes of the present invention fundamentally are achieved by employing a scanning technique capable of detecting deviations of focal plane images from fixed positions which obtain when the alignment of the optical axis relative to its mounting surface is true. The scanner is a part of a vidicon or its solid state equivalent which conventionally is a unitary part of such optical systems as the automatic astronomical telescopes. The vidicon itself includes an image-storing face plate disposed in the focal plane of the optics. Diffuse reflectors are arranged in predetermined positions on the face plate to project light through the optics onto a liquid pool which, in turn, reflects the light as images back to certain fixed locations on the face plate. For this purpose, the diffuse reflector arrangement is such that the images fall onto dark or unilluminated surface areas of the plate. Scanning determines the relative location of both the images and their reflector sources so that deviations of the images from their aligned positions can be measured.

BRIEF DESCRIPTION OF THE DRAWINGS

The invention is illustrated in the accompanying drawings of which.

DETAILED DESCRIPTION

Figure 1:
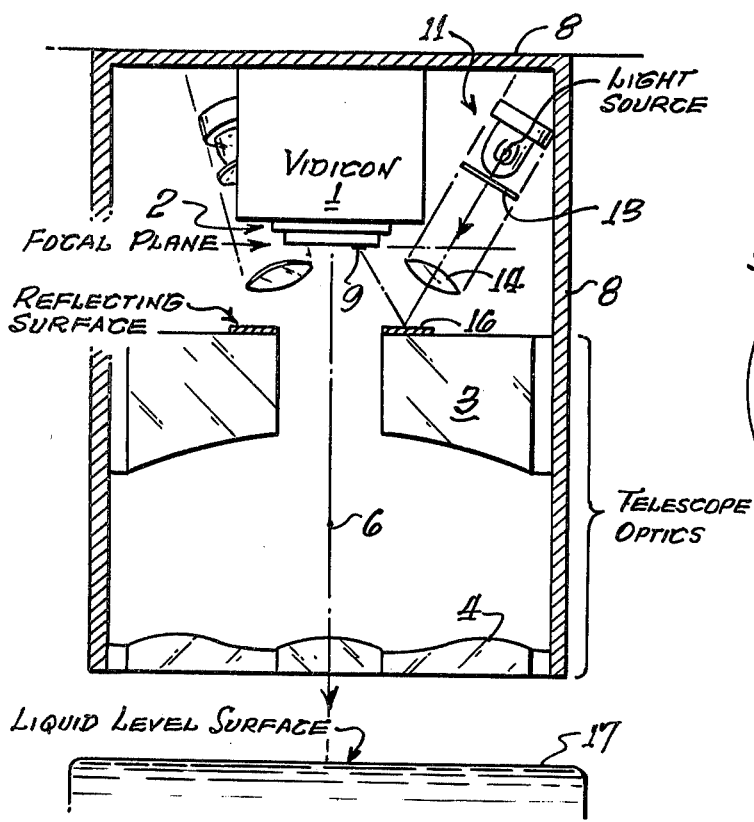
FIG. 1 is a schematic representation of the present apparatus applied to a telescope system including a vidicon and telescope optics.

The optical system in FIG. 1 includes a vidicon tube 1 having a face plate 2 and a lens system such as the illustrated Schmidt system which includes a spherical ground lens piece 3 and a corrective lens 4. This system as a whole constitutes a typical automatic, star-locater, astronomical telescope capable of providing large field surveys. In use, light from an external object, such as a star, in focussed by the telescope optics on the surface which is scanned by the vidicon. For example, vidicons for the most part employ an electron beam scanner to sweep a photoconductive surface on which light from the scene is stored. The beam generates a signal responsive to the varying degrees of illumination and, in systems such as the astronomical telescope, the signal usually is transmitted for processing by a suitable computer. For present purposes, face plate 2 can be considered as the surface to be scanned. Also, insofar as the present invention is concerned, it should be recognized that other optical configurations are contemplated although these others at least should have the functional capability for automatically determining image locations formed in the focal plane.

The principal purpose of the present procedure is to measure the so-called 'alignment angle' between the optical axis of the system optics and a mounting surface by which the system is supported. The optical axis of the system is shown in FIG. 1 by the broken line 6. The support or mounting surfaces are indicated by structural member 8. As is known, large complex systems such as the astronomical telescopes conventionally are supported or mounted in such a manner that the optics to be moved as a unit to view any desired scene. Member or plate 8 is intended to schematically represent the essential mountings rather than to show any specific structural arrangement. In practice the vidicon and the optics may be secured to the support by special clamping means or the like and, in the case of large, complex systems such as are presently contemplated, their mounting is secured in a fixed position at the factory rather than by the user.

The particular point to be understood is that, when the optical system is secured to its mounting surfaces, its optical axis 6 must have a known orientation relative to these surfaces or, in other words, it should have a certain angular relationship relative to the mounting surface which, for the most part, will be a normal relationship. Variations or deviations will introduce operational errors and, obviously, if the degree or extent of the misalignment is not known, the resulting data will be inaccurate and unreliable. It therefore is essential to check the alignment prior to use and to either correct misalignments or determine the error so that it can be accommodated by the computer. This alignment measurement procedure has been routine practice but, as indicated, the procedures for its accomplishment primarily have relied upon considerable auxiliary test equipment operated by observers rather than being accomplished in a fully automatic manner which eliminates many of the sources of error affecting the precision of the measurements.

Figure 2:
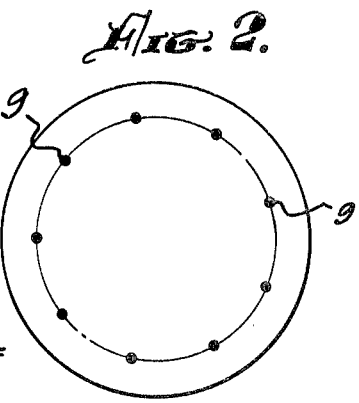
FIGS. 2-5 are views of the vidicon face plate showing the reflector elements and various positions of their pool-reflected images.

The present automatic procedure generally involves the use of diffuse reflectors 9 formed on face plate 2 of the vidicon and the further use of reflector illuminators 11 which throw light onto diffuse reflectors 9 so that they, in effect, become light sources. As shown in FIG. 2, reflectors 9 preferably are formed peripherally of the face plate in a circular, circumferentially-spaced arrangement. They may, for example, be aluminum or silver indicia etched on the plate in any suitable manner. For practical reasons, their peripheral locations should be such that they lie outside the useful field of the optics themselves.

Figure 3:
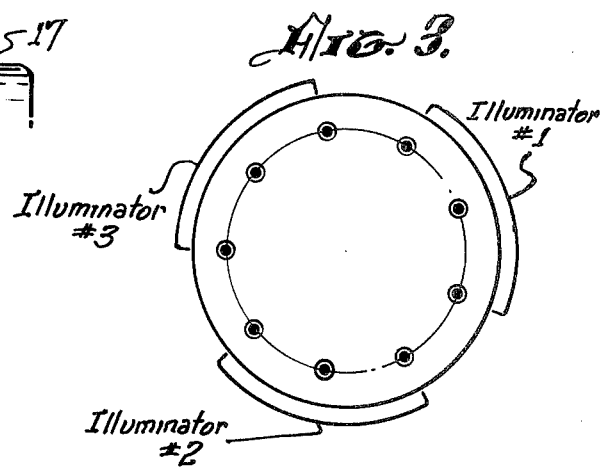

Illuminators 11 are conventional lamps and, as shown, three such lamps are used. Each lamp illuminates a certain arc of the reflector circle and, for this purpose, the lamps surround the vidicon and are equally spaced about the periphery of the telescope. The function of the lamps, however, is to illuminate only the reflectors themselves as well as a small surface area of the plate surrounding each illuminated reflector. All other surfaces of the face plate are unilluminated and relatively dark. This selective illumination is shown in FIG. 3 in which the area of the illuminations is indicated by open circles 12 each of which contain a reflector 9 which, accordingly, is a dark area surrounded by a bright one. To achieve the selective illumination suitable masks 13 are mounted in the light path of each lamp. The light passing through the masks is imaged by lens 14 via reflector surfaces 16 in a series of illuminated areas 19, each surrounding one of the diffuse reflectors 9. As shown in FIG. 1, surfaces 16 are provided on the upper surfaces of the spherical ground lens piece of the telescope optics. Obviously, in the illustrated embodiment, the mask of each illuminator is formed to transmit three spots of light to illuminate three of the nine diffuse reflectors 9. The function of the illuminators 11 and masks 13 in providing the illuminated spots 19 on the face of the vidicon alternatively may be provided by a set of light emitting diodes—one for each desired spot, imaged on the face of the vidicon by individual lenses 14.

Figure 4:
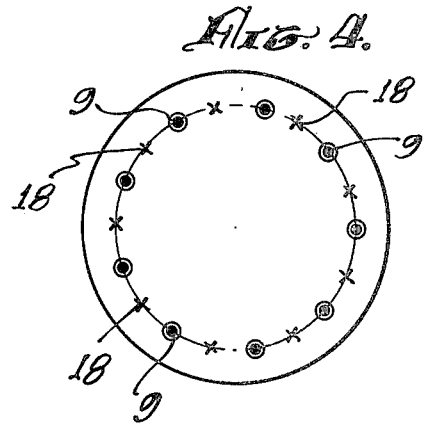

In making alignment angle measurements, it is necessary to provide a fiducial or standard with which deviations or misalignments can be compared. For this purpose, the present system utilizes a liquid mercury pool 17 which, of course, is on the opposite side of the telescope optics so that light from face plate reflectors 9 passes through the optics to be reflected as images 18 back onto the focal plane in which face plate 2 lies. FIG. 4 illustrates the positions of images 18 relative to reflectors 9 when the mounting is true or, in other words, when there is no misalignment error. As will be seen, each image 18 is formed on an unilluminated or relatively dark surface area of the face plate. Also, as shown, the images form a ring or circle lying in the circle of the reflectors. This condition results because reflections from the level mirror form images at locations diametrically opposite to the positions of the reflected light sources. It, of course, is essential that the three-pattern illuminators be configured to throw light onto the vidicon face only in the approximate areas where there are light sources or reflectors but not in the areas where the images lie. The de-focussing caused by the off-axis location of the illuminators does not cause problems because the vidicon response then is used to locate the dark sources (diffuse reflectors) enveloped in background light while the vidicon locates the bright images 18 returned from the level mirror of the mercury pool against the dark, unilluminated background of the face plate. As has been noted, when alignment is true, the images will be in fixed positions which, preferably, are centered between each reflector.

Figure 5:
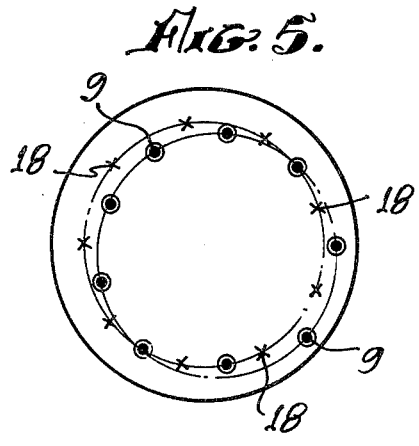

FIG. 5 shows a typical misalignment situation that must be corrected. As indicated, images 18 have deviated from their fixed positions relative to their light sources or reflectors 9. This misalignment, of course, is determined automatically by the scanning operation. In other words, the bright on dark and dark on bright relationships detect the positions of both the images and their sources. Alignment measurement then consists simply of the determination of the distance between the center of the vidicon face and the midpoint of each line segment formed by a source and its image. The multiplicity of sources provides a refinement of the precision of the measurement. Roughly, the precision is in proportion to the square root of the number of sources used.

In conducting the measurements, the preferred procedure is to initially mount the telescope system on its mounting or support surfaces without firmly securing its attachments. Light from face plate reflectors 9 then is reflected from the pool to provide the images of FIG. 5 which are detected by scanning. Normally, substantial misalignments will be apparent and these can be corrected or materially reduced by appropriate adjustments in the mounting. After the corrections, the mountings are firmly secured and another check made to determine any remaining deviations. If any remains, it then becomes a known error for which the computer can be programmed. Alternatively, mounting adjustments can be made until precise alignment is indicated.

The advantage of the present procedure lies in its simplicity and particularly in the fact that it can be accomplished in essentially an automatic manner. Once the diffuse reflector light sources have been etched onto the vidicon face, measurements can be achieved simply by illuminating the sources, reflecting their light from the inherently level pool and, finally, automatically detecting the relative locations of both the sources and their images.

Obviously, many modifications and variations of the present invention are possible in the light of the above teachings. It is therefore to be understood that within the scope of the appended claims the invention may be practiced otherwise than as specifically described.

I claim:

1. Apparatus for measuring the alignment angle between the optical axis of an optical system and its mounting surface, the optical system having its optics focussed at one of its ends on a face plate of a light-responsive scanner, comprising:

a pattern of circumferentially-spaced diffuser reflectors formed peripherally on said face plate, means for selectively illuminating each of said reflectors and an immediately adjacent surface portion of the face plate, and a light-reflecting liquid pool disposed at the other end of said focussed optics, said illuminated reflectors being so positioned and spaced that, when said alignment is true, their light is transmitted through said optics and back to said face plate as light source images to form a pattern in which each image is located at a fixed unilluminated face plate location, whereby said allignment angle measurement can be determined by scanning said plate to detect the extent to which the actual location of each image relative to its reflector source deviates from said true alignment fixed location.

2. The apparatus of claim 1 wherein said reflector pattern is circular and said image pattern is formed in the same circle.

3. Apparatus for measuring the alignment angle between the optical axis of an optical system and its mounting surface comprising:

a focussed optical lens system, a vidicon-type scanner having a photo-electrically scanned face plate disposed at one end of said lens system in its focal plane, a ring-like pattern of circumferentially-spaced diffuser reflectors formed peripherally on said face plate, means for selectively illuminating each of said reflectors and an immediately adjacent surface portion of the face plate, and a light-reflecting liquid pool disposed at the other end of said focussed lens system, said illuminated reflectors being so positioned and spaced that, when said alignment is true, their light is transmitted through said lens system and back to said face plate as light source images to form a ring-like pattern in which each image is located at a fixed unilluminated face plate location, whereby said alignment angle measurement can be determined by scanning said plate to detect the extent to which the actual location of each image relative to its reflector source deviates from said true alignment fixed location.

4. The apparatus of claim 3 wherein said means for selectively illuminating said reflectors includes:

a plurality of illuminators mounted in a circumferentially-spaced circular disposition surrounding said face plate, said illuminators projecting their light onto surface portions of said lens systems, reflecting surfaces formed on said light-receiving surface portions of said lens system for reflecting said received light onto said face plate, and a mask disposed in the projected light path of each illuminator, the masks being formed to reflectively illuminate said reflectors and their contiguous surface areas and the circumferentially-spacing of the illuminators being such that each illuminator illuminates a predetermined arcuate extent of said ring-like reflector pattern.

5. The apparatus of claim 4 wherein said illuminating means further includes:

an optical lens disposed in each of said projected light paths between said masks and said reflecting surfaces.

6. The apparatus of claim 5 wherein said focussed optical lens systems is a telescope system including a spherical ground lens and a corrective lens.

7. For use with a mounted optical system including telescope optics and a light-responsive scanner having a face plate disposed at one end of the telescope optics in its focal plane, a method of measuring the alignment angle between the optical axis of the system and its mounting plate comprising:

mounting said system on a support surface, forming a pattern of spaced diffuse reflectors on said face plate, selectively illuminating each of said reflectors and an immediately adjacent surface portion of the face plate whereby said reflectors provide light sources projecting their illumination through said telescope optics, reflecting said projected light passing through said optics from a level surface back through said optics to form light source images on said face plate, said spaced arrangement of said diffuse reflectors being such that said images are formed at fixed unilluminated locations on said plate when said optical axis is normal to said mounting plane, scanning said face plate to detect deviations between the actual locations of each reflector and its image, and adjusting said mounting to bring said actual locations into alignment with said fixed locations.

* * * * *